United States Patent
Hasegawa et al.

(10) Patent No.: US 6,421,957 B1
(45) Date of Patent: Jul. 23, 2002

(54) TRAY FOR GROWING PLANTS

(75) Inventors: Osamu Hasegawa; Yojiro Ohno, both of Chiba (JP)

(73) Assignee: Nisshinbo Industries, Inc., Tokyo (JP)

( * ) Notice: Subject to any disclaimer, the term of this patent is extended or adjusted under 35 U.S.C. 154(b) by 16 days.

(21) Appl. No.: 09/664,239

(22) Filed: Sep. 18, 2000

(30) Foreign Application Priority Data

Sep. 17, 1999 (JP) .......................................... 11-263978
Feb. 29, 2000 (JP) .......................................... 2000-53952

(51) Int. Cl.$^7$ .................................................. A01G 9/02
(52) U.S. Cl. ....................................................... 47/65.7
(58) Field of Search .......................................... 47/65.7

(56) References Cited

U.S. PATENT DOCUMENTS

| | | | | |
|---|---|---|---|---|
| 2,814,427 A | * | 11/1957 | Emery | 229/406 |
| 3,651,976 A | * | 3/1972 | Chadbourne | 220/23.4 |
| 3,890,195 A | * | 6/1975 | Lee | 162/387 |
| 3,891,499 A | * | 6/1975 | Kato | 162/157.5 |
| 4,088,259 A | * | 5/1978 | Sutton | 206/521.1 |
| 5,347,753 A | * | 9/1994 | Dall | 47/65.7 |

FOREIGN PATENT DOCUMENTS

| | | |
|---|---|---|
| CH | 442 846 | 8/1967 |
| GB | 1 520 291 | 8/1978 |
| JP | 62-248434 | 10/1987 |
| JP | 2245122 | 9/1990 |
| JP | 7327507 | 12/1995 |
| JP | 10311000 | 11/1998 |

OTHER PUBLICATIONS

Patent Abstracts of Japan—vol. 014, No. 134 (C–0701), Mar. 14, 1990 and JP 02 009324 A (Takasaki Kasei KK). Jan. 12, 1990.

* cited by examiner

Primary Examiner—Peter M. Poon
Assistant Examiner—Francis T. Palo
(74) Attorney, Agent, or Firm—Kilpatrick Stockton LLP

(57) ABSTRACT

A pulp mold is prepared by suction molding from pulp slurry, preferably pulp slurry containing a heat-fusible resin, antifungal agent and water repellant or waterproofing agent, and then by hot pressing to form a tray for growing plants composed of the pulp mold, which exhibits excellent dimensional accuracy, maintains mechanical strength in use over a long period of time, and applies little load on the environment.

10 Claims, 1 Drawing Sheet

TRAY FOR GROWING PLANTS

BACKGROUND OF THE INVENTION

1. Field of the Invention

The present invention relates to a tray for growing plants, which is used for raising plant seedlings or tissue culture of plants. More particularly, the present invention relates to a tray for growing plants, which consists of a pulp mold obtained from pulp slurry by suction molding.

2. Description of the Related Art

Among trays, sheets and pots used for growing plants, trays consisting of pulp molds obtained by suction molding of pulp slurry are known. Because such pulp molds incline to be deformed, methods for preventing the deformation have been proposed.

For example, there is known a method for producing a pot sheet for growing plants, which comprises providing a male mold comprising a plurality of protrusions arranged in square and an upward bent periphery attached to an outer periphery of a flange surrounding the base portions of the protrusions arranged in square, with each protrusion consisting of a truncated cone composed of net for paper making and a projection net for paper making provided on the top of the truncated cone, overdrying a paper product on the mold, and stacking and fitting a plurality of the paper products (Japanese Patent Publication (Kokoku) No. 5-38581/1993), a plant growing bed comprising a pulp mold having a plurality of pots which are connected together at opening sides thereof and: have independent perforated bottom portions, wherein the paper mold is placed with the opening side as the under side and the bottom side as the upper side and the mold is filled with a bed material to form the bed for growing plants, and when the bed for growing plants is used for growing plants, each pot is seeded so that a plant is grown in each pot, and when each plant is transferred, the lower part of the mold for growing plants is separated so that plants were separately transferred with each pot (Japanese Patent No. 2600891) and so forth.

However, in the method of Japanese Patent Publication (Kokoku) No. 5-38581/1993, the pot sheets suffer from warpage and distortion due to moisture adsorption after drying, which degrade the dimensional accuracy. Further, it also suffers from a problem concerning mechanical strength, i.e., they cannot be transferred without a holding fixture upon transportation. The bed for growing plants of Japanese Patent No. 2600891 also suffers from insufficient dimensional accuracy and mechanical strength.

Furthermore, as a tray; using a plastic instead of pulp mold, there has been proposed a tray for growing plants which is obtained by lining up and arranging a suitable number of plant housing units made of a plastic having flexibility and elasticity in the longitudinal and transverse directions, connecting top peripheral edges of the openings of the adjoining plant housing units, and providing dish-like parts downwardly protruding at the bottom of the plant housing units, wherein the dish-like parts can freely protrude upwardly (Japanese Patent Laid-open (Kokai) No. 7-327507/1995). However, this tray for growing plants applies much load on the environment upon disposal because it uses a plastic.

Further, as a pulp mold of good dimensional accuracy, there has been proposed a pulp mold produced by wet suction molding, which includes fine fibers having 150–500% of water holding capacity defined in JAPAN TAPPI No. 26-78 (Japanese Patent Laid-open (Kokai) No. 10-311000/1998). Although use of this pulp mold is not particularly limited, it is to be mainly used as a packaging material, and use for trays for growing plants is not suggested.

SUMMARY OF THE INVENTION

The present invention was accomplished in view of the above problems, and an object is to provide a tray for growing plants composed of a pulp mold, which exhibits excellent dimensional accuracy, maintains mechanical strength in use over a long period of time, applies little load on the environment, and preferably exhibits excellent air permeability.

The inventors of the present invention assiduously studied in order to achieve the aforementioned object. As a result, they found that mechanical strength and dimensional accuracy of a tray for growing plants comprising a pulp mold can be improved by subjecting the pulp mold for the tray to hot pressing after molding, and the mechanical strength and dimensional accuracy can further be improved by adding a heat-fusible resin to a pulp slurry for the tray. Thus, they accomplished the present invention.

That is, the present invention provides the followings.

(1) A tray for growing plants, which is composed of a pulp mold obtained from pulp slurry by suction molding and hot pressing after molding.

(2) The tray for growing plants according to (1), wherein the pulp slurry contains a heat-fusible resin.

(3) The tray for growing plants according to (2), wherein the heat-fusible resin is one of resins selected from polyethylene, polypropylene, polyester, polyvinyl alcohol and acrylic resin or a mixture of two or more of them.

(4) The tray for growing plants according to any one of (1)–(3), wherein the pulp slurry contains a antifungal agent.

(5) The tray for growing plants according to any one of (1)–(4), wherein the pulp slurry contains a water repellant and/or a waterproofing agent.

DETAILED DESCRIPTION OF THE PREFERED EMBODIMENTS

Figure 1:
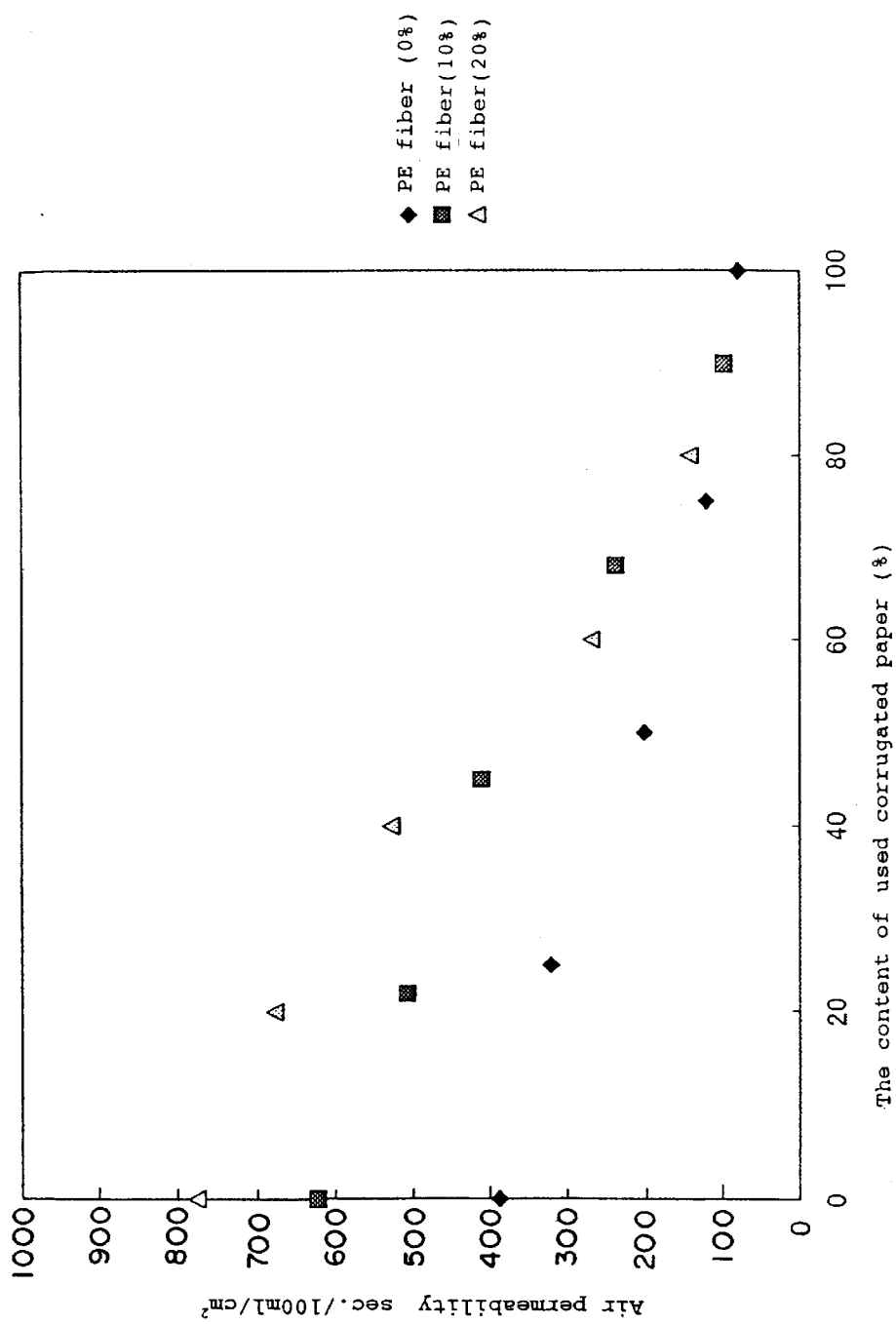
FIG. 1 is a graph representing relationship of ratios of PE fibers in pulp mold as well as used corrugated paper in main raw materials and air permeability.

The present invention will be explained in detail hereafter.

The tray for growing plants of the present invention consists of a pulp mold obtained by suction molding from pulp slurry and by hot pressing after molding.

Raw material of the pulp slurry is not particularly limited, and may be any material used in the conventional pulp mold manufacturing process, for example, mechanical pulp, ground pulp, chemical pulp, soda pulp, used paper pulp, dissolving pulp, bast pulp, synthetic pulp or the like. In the present invention, used paper pulp obtained by fibrillating used paper, such as newspaper, magazines and copy paper or corrugated paper, may be preferably used. Used paper containing a heat-fusible resin can also be used. Among those materials for used paper pulp, used corrugated paper is most preferred from the viewpoint of the air permeability of the pulp mold.

According to the present invention, the pulp slurry preferably contains a heat-fusible resin. By adding a heat-fusible resin to the pulp slurry, the effect of hot pressing after molding to be a pulp mold can be enhanced. The heat-fusible resin includes polyethylene, polypropylene, polyester, polyvinyl alcohol, acrylic resins and so forth. While shape of the heat-fusible resin is not particularly limited, those in fiber shape are generally used.

The content of the heat-fusible resin is generally 20% or less, preferably 10–15%, based on the whole pulp mold. As the ratio of the heat-fusible resin increases, mechanical strength of the pulp mold is improved but air permeability tends to decrease.

The pulp slurry may contain an antifungal agent. Inclusion of the antifungal agent can prevent propagation of microorganisms such as fungi on the tray for growing plants during use. The content of the antifungal agent is generally 5% or less, preferably 0.5–3%, based on the whole pulp mold.

In addition, the pulp slurry may contain a water repellant, waterproofing agent, or both of them. Inclusion of a water repellant or waterproofing agent can prevent deformation or destruction of the pulp mold caused by moisture absorption during use. The content of a water repellant or waterproofing agent is generally 10% or less, preferably 0.5–5.0%, based on the whole pulp mold.

The pulp slurry may contain other additives such as a dry mechanical strength enhancing agent, wet mechanical strength enhancing agent, pH modifier and the like so long as the advantage of the present invention is not degraded. The content of the additives is generally 5% or less, preferably 0.5–3%, based on the whole pulp mold.

The tray for growing plants may be produced as follows. For example, pulp slurry materials, such as used paper, are fibrillated in an aqueous solution and added with various additives, as required. While the concentration of the pulp slurry is not particularly limited, it is normally from 0.5–10%, preferably 2–5%, based on the water amount. Nutrients required for raising seedlings by using the tray of the present invention may be added to the pulp slurry.

Using the obtained pulp slurry, a pulp mold is produced by suction molding using metallic molds. The shape of the metallic molds is not particularly limited and may be in any shape so long as the molded product can be used as trays for growing plants in a shape of pot, sheet or the like.

Then, the pulp mold is dried until the moisture content becomes about 5–10%, for example, and the pulp mold is conditioned at a temperature of about 20–30° C. and a humidity of about 40–60% RH.

Subsequently, the above pulp mold is subjected to hot pressing. The temperature of the hot pressing is generally 100–300° C., preferably 150–200° C. The pressure is generally 5–100 kg/cm$^2$, preferably 30–50 kg/cm$^2$. Pressing time is generally 5–60 seconds, preferably 5–20 seconds.

The tray for growing plants of the present invention is usually a tray having a plurality of cells for multiple seedlings. However, it may be divided into single cells each for single seedling. Further, it may be divided for each seedling after seedlings are raised, and used for subsequent processes.

The tray for growing plants of the present invention has excellent mechanical strength as well as good air permeability. Therefore, it secures good air circulation in the vicinity of plant roots. As a result, rooting of plants can be promoted and good growth of the plant bodies can be attained. Propagation of various microorganisms that may be caused by the improved air permeability can be prevented by adding an antifungal agent. By utilizing used paper or the like as the raw material, load applied on the environment can be minimized in view of supply of materials, waste generated in manufacturing process, situations of post usage and so forth.

EXAMPLES

Hereafter, the present invention will be explained in more detail with reference to the following examples and comparative examples.

In the following examples and comparative examples, the term "material ratio" means a weight ratio of each material relative to the total amount of the main material, and "additive ratio" means a weight ratio of the amount of the additive relative to the total amount of the main material, unless otherwise indicated. The material ratio does not include the additive ratio.

Example 1

Raw materials (used newspaper: 70%, used corrugated paper: 30%) were disaggregated in an aqueous solution (concentration: 4%) using a fibrillating machine. This suspension was transferred to a paper making tank, added with water so as to lower the concentration to 2%, and thoroughly dispersed to obtain pulp slurry. Then, a metallic mold equipped with a pulp mold molding machine, which was designed to make a tray of pulp mold for growing plants which has a length of 580 mm, a width of 280 mm and a height of 64 mm was immersed into the stirred slurry, and the pulp slurry was adsorbed and laminated on the metallic mold by vacuum suction. Then, the metallic mold was pulled up from the slurry and turned by 180 degrees. The pulp mold had a structure where cells of 3.5 cm in length, 3.5 cm in width, and 5.8 cm in height (inner volume of about 70 cm$^3$) were arranged in 6 columns lengthwise and 12 rows crosswise (72 cells in total) when it was observed from the top.

The adsorbed and laminated pulp mold was turned upward with suction, and an upper mold with vacuum suction was put on the pulp mold from above. Simultaneously, the suction pressure of the metallic mold was released. Then, positive pressure was given to transfer the pulp mold to the upper mold. The pulp mold was removed from the upper mold and dried with hot air blow to obtain a pulp mold for a tray for growing plants, which has a moisture content of 7% and an average thickness of about 3 mm. The obtained pulp mold for a tray for growing plants was conditioned under the conditions of 25° C. and 60% RH.

The dried pulp mold for a tray for growing plants was held between a pair of metallic molds having precise tray shapes (male mold and female mold) from the upper side and the bottom side of tray, and subjected to hot pressing (200° C., 40 kg/cm$^2$, 10 seconds) to obtain a pulp mold for a tray for growing plants.

Compositions of the pulp molds for a tray for growing plants of this example and those of other examples and comparative examples are shown in Table 1. There were used acrylic resin (Arakawa Chemical Industries Ltd.) as a dry mechanical strength enhancing agent, rosin (Arakawa Chemical Industries Ltd.) as a waterproofing agent, polyolefine derivative (Saiden Chemical Industry Co., Ltd.) as water repellant, aluminum sulfate (Oji Paper Co., Ltd.) as a pH modifier, polyamide resin (Arakawa Chemical Industries Ltd.) as a wet mechanical strength enhancing agent, and organic azotic compound (K-I Chemical Industry Co., Ltd.) as an antifungal agent.

TABLE 1

|  | Example | | | | | | Comparative Example | | | | | |
| --- | --- | --- | --- | --- | --- | --- | --- | --- | --- | --- | --- | --- |
|  | 1 | 2 | 3 | 4 | 5 | 6 | 1 | 2 | 3 | 4 | 5 | 6 |
| Raw materials | | | | | | | | | | | | |
| Used newspaper | 70 | 57 | 70 | 57 | 70 | 57 | 70 | 57 | 70 | 57 | 70 | 57 |
| Used corrugated paper | 30 | 25 | 30 | 25 | 30 | 25 | 30 | 25 | 30 | 25 | 30 | 25 |
| PE fibers |  | 15 |  | 15 |  | 15 |  | 15 |  | 15 |  | 15 |
| PE/PP fibers |  | 3 |  | 3 |  | 3 |  | 3 |  | 3 |  | 3 |
| Additives | | | | | | | | | | | | |
| Dry mechanical strength enhancing agent |  |  | 1.00 | 1.00 | 1.00 | 1.00 |  |  | 1.00 | 1.00 | 1.00 | 1.00 |
| Waterproofing agent |  |  | 1.20 | 1.20 | 1.20 | 1.20 |  |  | 1.20 | 1.20 | 1.20 | 1.20 |
| Water repellant |  |  | 2.00 | 2.00 | 2.00 | 2.00 |  |  | 2.00 | 2.00 | 2.00 | 2.00 |
| pH modifier |  |  | 2.50 | 2.50 | 2.50 | 2.50 |  |  | 2.50 | 2.50 | 2.50 | 2.50 |
| Wet mechanical strength enhancing agent |  |  | 0.50 | 0.50 | 0.50 | 0.50 |  |  | 0.50 | 0.50 | 0.50 | 0.50 |
| Antifungal agent |  |  |  |  | 0.50 | 0.50 |  |  |  |  | 0.50 | 0.50 |
| Hot pressing | Used | Used | Used | Used | Used | Used | Not used | Not used | Not used | Not used | Not used | Not used |

Example 2

Pulp slurry was prepared and then a pulp mold for a tray for growing plants was produced in the same manner as in Example 1 except that PE (polyethylene) fibers and PE (polyethylene)/PP (polypropylene) fibers were further added to the raw materials (Composition, used newspaper: 57%, used corrugated paper: 25%, PE fibers: 15%, PE/PP fibers: 3%). The evaluation results for the pulp mold are shown in Table 2.

Example 3

A pulp mold for a tray for growing plants was produced in the same manner as in Example 1 except that various additives (dry mechanical strength enhancing agent (Arakawa Chemical Industries Ltd.): 1.0%, waterproofing agent (Arakawa Chemical Industries Ltd.): 1.2%, water repellant (Saiden Chemical Industry Co., Ltd.): 2.0%, pH modifier (Oji Paper Co., Ltd.): 2.5%, wet mechanical strength enhancing agent (Arakawa Chemical Industries Ltd.): 0.5%) were added to pulp slurry prepared in the same manner as in Example 1. The evaluation results for the pulp mold are shown in Table 2.

Example 4

A pulp mold for a tray for growing plants was produced in the same manner as in Example 1 except that PE fibers and PE/PP fibers, and various additives (dry mechanical strength enhancing agent (Arakawa Chemical Industries Ltd.): 1.0%, waterproofing agent (Arakawa Chemical Industries Ltd.): 1.2%, water repellant (Saiden Chemical Industry Co., Ltd.): 2.0%, pH modifier (Oji Paper Co., Ltd.): 2.5%, wet mechanical strength enhancing agent (Arakawa Chemical Industries Ltd.): 0.5%) were added to the raw materials. The evaluation results for the pulp mold are shown in Table 2.

Example 5

A pulp mold for a tray for growing plants was produced in the same manner as in Example 1 except that various additives (dry mechanical strength enhancing agent (Arakawa Chemical Industries Ltd.): 1.0%, waterproofing agent (Arakawa Chemical Industries Ltd.): 1.2%, water repellant (Saiden Chemical Industry Co., Ltd.): 2.0%, pH modifier (Oji Paper Co., Ltd): 2.5%, wet mechanical strength enhancing agent (Arakawa Chemical Industries Ltd.): 0.5%, antifungal agent (K-I Chemical Industry Co., Ltd.): 0.5%) were added to pulp slurry prepared in the same manner as in Example 1. The evaluation results for the pulp mold are shown in Table 2.

Example 6

A pulp mold for a tray for growing plants was produced in the same manner as in Example 1 except that PE fibers and PE/PP fibers, and various additives (dry mechanical strength enhancing agent (Arakawa Chemical Industries Ltd.): 1.0%, waterproofing agent (Arakawa Chemical Industries Ltd.): 1.2%, water repellant (Saiden Chemical Industry Co., Ltd.): 2.0%, pH modifier (Oji Paper Co., Ltd.): 2.5%, wet mechanical strength enhancing agent (Arakawa Chemical Industries Ltd.): 0.5%, antifungal agent (K-I Chemical Industry Co., Ltd.): 0.5%) were added to the raw materials. The evaluation results for the pulp mold are shown in Table 2.

Comparative Example 1

A pulp mold for a tray for growing plants was produced in the same manner as in Example 1 except that hot pressing was not conducted. The evaluation results for the pulp mold are shown in Table 2.

Comparative Example 2

A pulp mold for a tray for growing plants was produced in the same manner as in Example 2 except that hot pressing was not conducted. The evaluation results for the pulp mold are shown in Table 2.

Comparative Example 3

A pulp mold for a tray for growing plants was produced in the same manner as in Example 3 except that hot pressing was not conducted. The evaluation results for the pulp mold are shown in Table 2.

Comparative Example 4

A pulp mold for a tray for growing plants was produced in the same manner as in Example 4 except that hot pressing was not conducted. The evaluation results for the pulp mold are shown in Table 2.

Comparative Example 5

A pulp mold for a tray for growing plants was produced in the same manner as in Example 5 except that hot pressing was not conducted. The evaluation results for the pulp mold are shown in Table 2.

Comparative Example 6

A pulp mold for a tray for growing plants was produced in the same manner as in Example 6 except that hot pressing was not conducted. The evaluation results for the pulp mold are shown in Table 2.

<Evaluation of Pulp Mold for Tray for Growing Plants>

For each of the pulp mold for a tray for growing plants of the examples and comparative examples obtained as described above, dimensional accuracy and mechanical strength were evaluated as follows.

(1) Measurement of Dimensional Accuracy (Under Condition of Growing Plants)

Each of the produced pulp molds for a tray for growing plants was marked with a very thin marker pen at two points in a dry state (stored at 25° C., 60% RH), and the distance between the two points were measured (average length: 60 mm). After the pulp mold was left in a thermo-humidistat (condition of growing plants, temperature: 30° C., humidity: 70%) for one week, the distance between the two points was measured again, and swelling rate was calculated from the original length. Average values of randomly measured 20 sets for each are shown in Table 2.

(2) Measurement of Dimensional Accuracy (After Growing Plants)

Each of the produced pulp molds for a tray for growing plants was marked with a very thin marker pen at two points in a dry state (stored at 25° C., 60% RH), and the distance between the two points were measured (average length: 60 mm). Soil was put into the cells of the pulp mold for a tray for growing plants in the same manner as an actual procedure of growing plants, and plantlets (variety: sweet potato) were planted. Then, the plants were raised in a thermo-humidistat (condition of growing plants, temperature: 30° C., humidity: 70%) for three weeks, and the plants and soil were removed from the pulp mold. Then, the distance between the two points was measured again. Swelling rate was calculated from the original length. Average values of randomly measured 20 sets for each are shown in Table 2.

(3) Measurement of Mechanical Strength: Three-point Bending Strength

A part of each produced pulp mold for a tray for growing plants (length: 50 mm, width: 10 mm) was taken from its side wall and used as a sample for the three-point bending test using a tensile tester (Instron 5544, Instron Japan Co.). The measurement was performed at a cross-head speed of 5.0 mm/min, and maximum stress (Pa) and modulus of elasticity (Pa) at a yield point were measured. The results are shown in Table 2.

TABLE 2

| | Evaluation results | | | |
|---|---|---|---|---|
| | Dimensional accuracy | | Mechanical strength (3 point-bending strength) | |
| | Dimensional accuracy (condition of growing plants) | Dimensional accuracy (After growing plants) | Maximum Stress (Pa) | Elasticity (Pa) |
| Example | | | | |
| 1 | 0.35 | 0.95 | $5.19 \times 10^6$ | $8.68 \times 10^7$ |
| 2 | 0.25 | 0.30 | $1.10 \times 10^7$ | $2.99 \times 10^8$ |
| 3 | 0.20 | 0.45 | $1.13 \times 10^7$ | $4.51 \times 10^8$ |
| 4 | 0.15 | 0.23 | $1.94 \times 10^7$ | $1.19 \times 10^9$ |
| 5 | 0.20 | 0.40 | $1.23 \times 10^7$ | $6.98 \times 10^8$ |
| 6 | 0.15 | 0.23 | $2.00 \times 10^7$ | $1.39 \times 10^9$ |
| Comparative Example | | | | |
| 1 | 0.35 | 1.95 | $2.45 \times 10^6$ | $4.30 \times 10^7$ |
| 2 | 0.30 | 0.95 | $8.82 \times 10^6$ | $5.21 \times 10^7$ |
| 3 | 0.35 | 1.45 | $2.55 \times 10^6$ | $6.82 \times 10^7$ |
| 4 | 0.33 | 0.78 | $2.84 \times 10^6$ | $5.98 \times 10^7$ |
| 5 | 0.35 | 1.50 | $1.37 \times 10^7$ | $1.27 \times 10^8$ |
| 6 | 0.40 | 0.73 | $3.14 \times 10^6$ | $1.05 \times 10^6$ |

As seen from the results shown in Table 2, trays for growing plants which have good dimensional accuracy and high mechanical strength can be obtained in the examples according to the present invention. It can be seen from comparison of the results of Examples 1–6 that the mechanical strength of the tray for growing plants was improved by adding PE fibers and PE/PP fibers.

Examples 7–21

Materials shown in Table 3 were disaggregated and dispersed in an aqueous solution (concentration: 4%) using a fibrillating machine. In Table 3, PE fibers represent SWP (Mitsui Petrochemical Industries Ltd.) and PE/PP fibers represent polyolefine synthetic fibers (Chisso Corp.). Additives were prepared in the compositions shown in Table 4. In Table 4, the dry mechanical strength enhancing agent is acrylic resin (Arakawa Chemical Industries Ltd.), waterproofing agent is rogin (Arakawa Chemical Industries Ltd.), water repellant is polyolefine derivative (Saiden Chemical Industry Co., Ltd.), pH modifier is aluminum sulfate (Oji Paper Co., Ltd.), wet mechanical strength enhancing agent is polyamide resin (Arakawa Chemical Industries Ltd.), and antifungal agent is organic azotic compound (K.I Chemical Industry Co., Ltd.).

The above suspension was transferred to a paper making tank, added with water so as to lower the concentration to 2%, and thoroughly dispersed to obtain pulp slurry. Then, a metallic mold equipped with a pulp mold molding machine, which was designed to make a tray of pulp mold for growing plants which has a length of 580 mm, a width of 280 mm and a height of 64 mm was immersed into the stirred slurry, and the pulp slurry was adsorbed and laminated on the metallic mold by vacuum suction. Then, the metallic mold was pulled up from the slurry and turned by 180 degrees. The pulp mold had a structure where cells of 3.5 cm in length, 3.5 cm in width, and 5.8 cm in height (inner volume of about 70 cm$^3$) were arranged in 6 columns lengthwise and 12 rows crosswise (72 cells in total) when it was observed from the top.

The adsorbed and laminated pulp mold was turned upward with suction, and an upper mold with vacuum suction was put on the pulp mold from above. Simultaneously, the suction pressure of the metallic mold was released. Then, positive pressure was given to transfer the pulp mold to the upper mold. The pulp mold was removed from the upper mold and dried by a blow drier (80–130° C.) to obtain a pulp mold for a tray for growing plants, which has a moisture content of 7% and an average thickness of about 3 mm. The obtained pulp mold for a tray for growing plants was conditioned under the conditions of 25° C. and 60% RH.

The dried pulp mold for a tray for growing plants was held between a pair of metallic molds having precise tray shapes (male mold and female mold) from the upper side and the bottom side of tray, and subjected to hot pressing (150–250° C., 10–100 kg/cm$^2$, 5–60 seconds) to obtain a pulp mold for a tray for growing plants.

<Evaluation of Pulp Mold for Tray for Growing Plants>

For the pulp mold for tray for growing plants obtained as described above, air permeability was evaluated and seedling raising test was conducted as follows.

(1) Evaluation of Air Permeability

Air permeability of the pulp mold for a tray for growing plants obtained as described above was measured according to JIS P 8117 "Paper and board—determination of air permeance—Gurley Method". A larger value of air permeability indicates lower air permeability. As Comparative Example 7, the same test was performed by using a plastic tray.

The results are shown in Table 3. A graph representing the variation of air permeability with various amounts of PE fibers is shown in FIG. 1.

TABLE 3

Composition of main components and result of air permeability measurement

|  | Used newspaper | Used corrugated paper | PE fibers PE/PP fibers | Permeability sec/100 ml/cm$^2$ |
|---|---|---|---|---|
| Example 7 | 100 | 0 | 0 | 389 |
| Example 8 | 75 | 25 | 0 | 329 |
| Example 9 | 50 | 50 | 0 | 202 |
| Example 10 | 25 | 75 | 0 | 122 |
| Example 11 | 0 | 100 | 0 | 81 |
| Example 12 | 90 | 0 | 10 | 625 |
| Example 13 | 68 | 22 | 10 | 509 |
| Example 14 | 45 | 45 | 10 | 411 |
| Example 15 | 22 | 68 | 10 | 238 |
| Example 16 | 0 | 90 | 10 | 99 |
| Example 17 | 80 | 0 | 20 | 780 |
| Example 18 | 60 | 20 | 20 | 681 |
| Example 19 | 40 | 40 | 20 | 531 |
| Example 20 | 20 | 60 | 20 | 270 |
| Example 21 | 0 | 80 | 20 | 143 |
| Comparative Example 7 | — | — | — | ∞ |

TABLE 4

Composition of additives

| Additives | Ratio of Additives (*1) |
|---|---|
| Dry mechanical strength enhancing agent | 1.0 |
| Water repellant | 3.0 |
| pH modifier | 2.5 |
| Wet mechanical strength enhancing agent | 0.5 |
| Antifungal agent | 1.0 |

*1: Weight ratio of additives relative to total amount of the main materials

From the results shown in Table 3, it was confirmed that the pulp mold of the examples had substantial air permeability compared with that of Comparative Example 7 (plastic tray). Further, as the pulp molds contained more used corrugated paper as the main components, the air permeability tended to increase. Furthermore, when contents of used newspaper and used corrugated paper were the same, as the pulp molds contained more PE fibers, the air permeability tended to decrease.

(2) Seedling Raising Test

Seedling raising test was performed by using the pulp mold for a tray for growing plants of Examples 12, 13 and Comparative Example 7 obtained as described above.

Seedlings of the sweet potato were planted in the pulp mold for a tray for growing plants containing commercially available soil for raising seedlings (Yanmer: Napra soil) and were raised under the condition of a temperature of 25° C., humidity of 80%, day period of 16 hours (dark period of 8 hours) with light intensity of 8000 luxes. After three weeks, fresh weight, weight of root, dry weight and length of stem were measured for each seedling. The results are shown in Table 5. Each value is shown as average value for the total number of plants evaluated.

TABLE 5

Results of seedling raising test

| Unit | Permeability sec/100 ml/cm$^2$ | Number of plants Plant | Fresh weight g | weight of root g | Dry weight g | Stem length mm |
|---|---|---|---|---|---|---|
| Example 12 | 625 | 24 | 2.70 | 0.61 | 0.38 | 68.0 |
| Example 13 | 509 | 24 | 2.91 | 0.68 | 0.39 | 68.3 |
| Comparative example 7 | ∞ | 25 | 2.68 | 0.47 | 0.34 | 67.4 |

Therefore, although plant sizes after growth (a part above the ground) were almost similar, it was confirmed by particular observation of roots that the growth of root was better in Examples 12 and 13 than in Comparative Example 7 (plastic tray). It was also confirmed that better growth was observed in Example 13, in which better air permeability was attained, compared with Example 12. This suggests that air permeability of a tray for growing plants promotes growth of plant root.

The tray for growing plants of the present invention is superior to conventional products with regard to dimensional accuracy and mechanical strength during use. In addition, the tray for growing plants according to a preferred embodiment of the present invention shows superior air permeability.

Having thus described the present invention, it will be obvious that the same may be varied in various ways. Such variations are not to be regarded as departure from the spirit and scope of the invention, and all such modifications would be obvious for one skilled in the art intended to be included within the scope of the following claims.

What is claimed is:

1. A tray for growing plants, comprising a suction molded, dried, conditioned, hot pressed pulp mold, wherein the tray is obtained by suction molding a pulp slurry to obtain a pulp mold; drying the pulp mold until a moisture content of the pulp mold becomes 5–10%; conditioning the pulp mold at a temperature of 20–30° C. and a humidity of 40–60% RH; and hot pressing the pulp mold after conditioning.

2. The tray for growing plants according to claim 1, wherein the pulp slurry contains a heat-fusible resin.

3. The tray for growing plants according to claim 2, wherein the heat-fusible resin is one of resins selected from polyethylene, polypropylene, polyester, polyvinyl alcohol and acrylic resin or a mixture of two or more of them.

4. The tray for growing plants according to any one of claims 1–3, wherein the pulp slurry contains an antifungal agent.

5. The tray for growing plants according to any ones of the claims 1–3, wherein the pulp slurry contains a water repellent and/or a waterproofing agent.

6. A method of producing a tray for growing plants, the tray comprising a pulp mold, comprising the steps of:

suction molding a pulp slurry to obtain the pulp mold;

drying the pulp mold until a moisture content of the pulp mold becomes 5–10%;

conditioning the pulp molding at a temperature of 20–30° C. and a humidity of 40–60% RH; and hot pressing the pulp mold after conditioning, to obtain the tray.

7. The method according to claim 6, wherein the pulp slurry contains a heat-fusible resin.

8. The method according to claim 7, wherein the heat-fusible resin is one of resins selected from polyethylene, polypropylene, polyester, polyvinyl alcohol and acrylic resin, or a mixture of two or more of them.

9. The method according to any one of claims 6–8, wherein the pulp slurry contains an antifungal agent.

10. The method according to any one of claims 6–8, wherein the pulp slurry contains at least one of a water repellant and a waterproofing agent.

* * * * *